US012344016B2

(12) United States Patent
Woods et al.

(10) Patent No.: US 12,344,016 B2
(45) Date of Patent: Jul. 1, 2025

(54) SYSTEMS AND METHODS FOR SUBSTRATE DECORATION

(71) Applicant: ACTEGA North America Technologies, Inc., Cinnaminson, NJ (US)

(72) Inventors: Michael Clarke Woods, Saunderstown, RI (US); Michael Medeiros, Mattapoisett, MA (US)

(73) Assignee: ACTEGA North America Technologies, Inc., Cinnaminson, NJ (US)

(*) Notice: Subject to any disclaimer, the term of this patent is extended or adjusted under 35 U.S.C. 154(b) by 90 days.

(21) Appl. No.: 18/351,632

(22) Filed: Jul. 13, 2023

(65) Prior Publication Data

US 2024/0025187 A1 Jan. 25, 2024

Related U.S. Application Data

(60) Provisional application No. 63/391,027, filed on Jul. 21, 2022.

(51) Int. Cl.
*B41J 3/407* (2006.01)
*B41J 11/00* (2006.01)
*B65C 9/00* (2006.01)

(52) U.S. Cl.
CPC ........... *B41J 3/4075* (2013.01); *B41J 3/4073* (2013.01); *B41J 11/00214* (2021.01); *B41J 11/007* (2013.01); *B65C 9/0015* (2013.01)

(58) Field of Classification Search
CPC .. B41J 3/4075; B41J 11/00214; B41J 3/4073; B41J 11/007; B65C 9/0015
See application file for complete search history.

(56) References Cited

U.S. PATENT DOCUMENTS 6,338,263 B1 * 1/2002 Obata .................... B21D 51/26 72/94
6,357,941 B1 * 3/2002 Amano ..................... G09F 3/10 60/761

(Continued)

FOREIGN PATENT DOCUMENTS

WO WO 2018/195469 A2 10/2018
WO WO 2020/001987 A1 1/2020
WO WO 2021/138158 A1 7/2021

OTHER PUBLICATIONS

International Search Report and Written Opinion for International Application No. PCT/US2023/028019, mailed Nov. 3, 2023.

*Primary Examiner* — David H Banh
(74) *Attorney, Agent, or Firm* — Wolf, Greenfield & Sacks, P.C.

(57) ABSTRACT

Systems and methods for applying decorations onto substrates. Decorations can be transported on a web along the web path to an application station at which the decorations are applied to substrates. Movement of substrates through the application station can be controlled to effect transfer of a decoration to a substrate. The web and a substrate support that urges a substrate into contact with a decoration on the web can be moved in the same direction, e.g., at different speeds. The substrate can be rotated during decoration transfer about an axis that passes through the substrate, e.g., the substrate can be rotated 180 degrees or more during transfer.

39 Claims, 5 Drawing Sheets

(56) References Cited

U.S. PATENT DOCUMENTS

| | | | | |
|---|---|---|---|---|
| 6,916,130 | B1 * | 7/2005 | Holt | B41J 3/54<br>347/171 |
| 2010/0326581 | A1 * | 12/2010 | Roseman | B65C 9/1865<br>156/60 |
| 2014/0340458 | A1 * | 11/2014 | Bellmyer | B41J 3/54<br>347/171 |
| 2015/0083337 | A1 * | 3/2015 | Peckham | B65C 9/14<br>156/578 |
| 2018/0346174 | A1 * | 12/2018 | Lux | B65C 9/0006 |
| 2020/0001620 | A1 * | 1/2020 | Lux | B65C 9/1869 |

* cited by examiner

SYSTEMS AND METHODS FOR SUBSTRATE DECORATION

RELATED APPLICATIONS

This Application is a Non-Provisional of U.S. application Ser. No. 63/391,027, filed Jul. 21, 2022, entitled "SYSTEMS AND METHODS FOR SUBSTRATE DECORATION".

FIELD

Disclosed embodiments are related to systems and methods for decorating substrates.

BACKGROUND

Adhesive labels are widely used, such as for providing information and/or decoration on substrates such as bottles and other containers, packages, and so on. In some applications, decorations such as labels are formed at a printing facility, which provides the labels on a continuous web that may be rolled onto a spool. During a subsequent labeling process, the web is unwound from the spool and guided through a pre-defined path to a location at which the labels are removed from the web and applied to the substrate.

The labels typically have an adhesive side, whether formed by a pressure-sensitive adhesive (PSA), a glue applied to the label or a thermally-activated or fluid-activated adhesive, that serves to secure the label to a box, product or other substrate. When the label is applied to the substrate, the adhesive side may be exposed, e.g., by peeling the label from the web or by removing a liner from the adhesive side. In certain applications, the adhesive side may be non-tacky until just prior to applying the label, at which time the adhesive is activated (e.g., by applying heat or an activation fluid) and the label is applied to the substrate.

SUMMARY

Aspects described herein relate to systems and methods for decorating substrates.

According to some embodiments, decorations (e.g., labels) may be formed on a web (e.g., a film, belt or other suitable web substrate) at one or more decoration forming stations positioned along a web path, and the decorations may be subsequently applied to substrates at an application station positioned along the web path after the decoration forming station(s). In this manner, a single system may be used to both form the decorations and apply the decorations to substrates. In some embodiments, decorations may be formed in advance on a web and then later applied to substrates using a separate decoration application system. Thus, two or more separate systems may be used to produce decorations on a web, and to apply those pre-formed decorations onto substrates.

Decorations may be formed in any suitable way on a web. Printers such as inkjet, flexographic or other suitable printing systems can be used to deposit one or more decoration layers on the web to form a decoration. The decorations may include one or more decoration layers formed in register with one another on the web to form the decoration. Moreover, the decorations can include an adhesive layer, such as a pressure sensitive adhesive layer, formed in register with the one or more decoration layers. The adhesive layer can be activatable such that the adhesive is initially deposited as a coating and subsequently activated to become tacky, e.g., by way of a solvent, UV light, heat, etc. Prior to application of the decorations to the substrates, the adhesive layer is exposed on a surface of the decoration facing outwardly from the web. When a decoration is applied to a substrate at the application station, the adhesive layer can be brought into contact with a surface of the substrate to adhere the decoration to the substrate as it is released from the web. For example, in embodiments employing a pressure sensitive adhesive layer, an adhesion between the pressure sensitive adhesive layer and the substrate may be sufficient to pull the decoration from the web, thereby releasing the decoration from the web.

Each decoration formed on the web may include a single element that may be applied to a substrate at the application station, or each decoration can include multiple discrete elements that are separate from each other though initially supported on the web and transferred to the same substrate. Each element of a decoration may include one or more decoration layers and a pressure sensitive adhesive layer formed in register with one another to form the decoration element. In some instances, the term "label" may be used to refer to a decoration; accordingly, as used herein, the terms "decoration" and "label" have the same meaning and may be used interchangeably. Thus, in some cases, a label may include a single element or multiple elements that are transferred together to a substrate. Moreover, it should be understood that the term decoration does not necessarily refer to "decorating" an item in any particular aesthetic sense. For example, a decoration may provide visible graphics, text, colors, optical effects (like diffraction that gives a rainbow effect), machine readable indicia (such as a barcode), tactile effects, topographical features, and so on.

As noted above, decorations on the web can be applied to substrates at an application station positioned along a web path of the web. In some instances, applying a decoration to a substrate may involve directly transferring the decoration to the substrate from the web. In such embodiments, the decoration is always supported by either the web or the substrate. In other instances, a decoration may be partially or completely separated from the web prior to being applied to the substrate. For example, a portion of a decoration may be separated from the web prior to being applied to the substrate to aid in releasing the decoration from the web when the decoration is applied to the substrate. Moreover, in some instances, multiple portions of a decoration (e.g., separate discrete portions) may be applied to a substrate in a single application or the separate portions may be applied in separate application steps at the application station.

In some embodiments, a method for decorating a substrate includes moving a web having a decoration on a first side of the web at an application station such that the decoration is moved at a web speed in a web direction. The decoration can have an adhesive exposed on a surface of the decoration facing outwardly from the first side of the web. A substrate support can be moved at the application station at a support speed along the web direction with the substrate support urging a substrate into contact with the decoration. The substrate can be rotated at the application station about a rotation axis that passes through the substrate, and the decoration can be transferred from the web to the substrate at the application station while the decoration moves in the web direction and the substrate rotates about the rotation axis and the substrate support moves along the web direction.

In some cases, the substrate support can include a belt that moves, e.g., along the web direction, and contacts the substrate to urge the substrate into contact with the decoration. In some embodiments, a portion of the belt or other substrate support that contacts the substrate can be moved along the web direction at a support speed that is less than, or that is greater than, the web speed. Such difference in web speed and support speed can cause the substrate to rotate or otherwise move relative to the web and substrate support. In some embodiments, movement of the web can at least in part drive rotation of the substrate. In some cases, the substrate support can include a platform that moves (e.g., along the web direction) and on which the substrate is mounted. In some cases, the platform can be rotated about an axis to rotate the substrate about the rotation axis.

In some embodiments, the web direction is linear, e.g., the web and decoration can move along a straight line or path at the application station. The substrate support can move along a linear direction as well. In some embodiments, the substrate support (such as a portion of a moving belt) can urge a plurality of substrates at the application station into contact with the web, e.g., to effect decoration transfer for multiple substrates at a same time. Thus, the substrate support can urge each of a plurality of substrates into contact with a respective decoration on the web.

In some embodiments, a system for decorating substrates includes a web including a plurality of decorations on a first side of the web with each decoration having an adhesive exposed on a surface of the decoration facing outwardly from the first side of the web. An application station can be provided at which the decorations are applied from the web to substrates and a web path along which the web travels to transport the decorations to the application station. A web control system can be configured to control movement of the web along the web path, and a substrate transport can have a portion configured to urge a substrate into contact with a decoration on the web at the application station. As examples, the substrate transport can include a substrate support such as a belt or platform that engages with one or more substrates and urges the substrate(s) into contact with a decoration at the application station. A controller can be configured to control operation of the web control system and the substrate transport to transfer decorations from the web to substrates at the application station. For example, the controller can be configured to control the web control system to move a portion of the web bearing the decoration to move along a first direction at the application station and to control the portion of the substrate transport to move along the first direction while urging the substrate into contact with the decoration moving at the application station and causing the substrate to rotate about a rotation axis that passes through the substrate.

In some cases, the substrate transport includes a belt having a portion configured to move along the first direction, contact the substrate and urge the substrate into contact with the decoration. In some embodiments, the controller can be configured to move the belt such that the portion of the belt moves at a speed that is less than, or greater than, a speed of the decoration at the application station. In some cases, the substrate transport includes a platform on which the substrate is mountable for movement along the first direction and rotation about the rotation axis for transfer of a decoration to the substrate. In some embodiments, the portion of the substrate transport (e.g., a portion of a belt or platform) moves in a linear direction at the application station. In some cases, the web and the decoration move in a linear direction at the application station. In some embodiments, the portion of the substrate transport can be configured to contact and urge a plurality of substrates into contact with the web and a respective decoration at the application station.

In some embodiments, the system includes a support surface positioned to urge the web and the decoration into contact with the substrate at the application station. For example, the support surface can include a roller, a belt or plate that is positioned on a side of the web and decoration opposite the substrate and configured to urge the web and decoration into contact with a substrate at the application station.

In some embodiments, a method for decorating a substrate includes moving a web having a decoration on a first side of the web at an application station such that the decoration is moved at a web speed along a first direction. The decoration can have an adhesive exposed on a surface of the decoration facing outwardly from the first side of the web. A substrate support can be moved at the application station at a support speed that is different from (e.g., greater or less than) the web speed along the first direction and can urge a substrate into contact with the decoration. The decoration can be transferred from the web to the substrate at the application station while the decoration moves along the first direction at the web speed and the substrate support moves along the first direction at the support speed.

In some cases, the substrate can be rotated at the application station about a rotation axis that passes through the substrate during transfer of the decoration to the substrate. In some embodiments, the substrate support includes a belt or platform that moves and contacts the substrate to urge the substrate into contact with the decoration. In some cases, the substrate support such as a belt or platform can move along the first direction. In embodiments where the substrate support includes a platform, the platform can be rotated about an axis to rotate the substrate about the rotation axis. In some case, movement of the web and the substrate support can include moving the substrate relative to both the web and the substrate support.

In some embodiments, the web and decoration and/or the substrate support are moved in a linear direction or parallel directions at the application station. In some cases, the substrate support can move such that the substrate support simultaneously urges a plurality of substrates into contact with the web, e.g., a belt or multiple platforms can urge a plurality of substrates into contact with a respective decoration on the web.

Moreover, as described in more detail below, the systems described herein may further include one or more features configured for web accumulation and/or control of the tension of the web. For example, such features may include one or more web festoons positioned along a web path before the decoration forming stations, between decoration forming stations and/or curing stations, between a decoration forming station and an application station or curing station, between a curing station and an application station, and/or after an application station.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
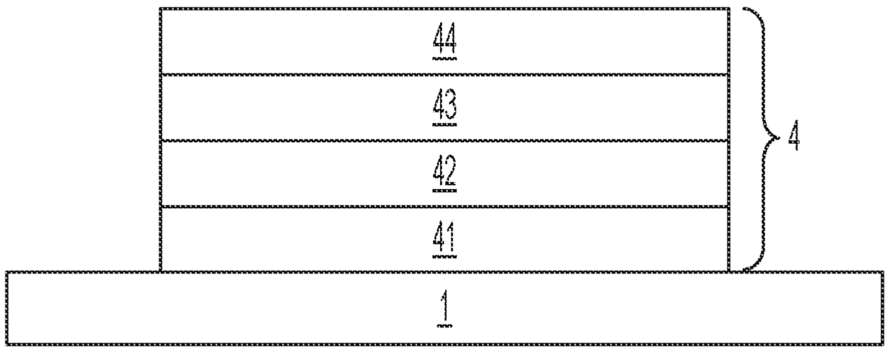
FIG. 1 a schematic cross-sectional view of a decoration on a web in an illustrative embodiment.

It should be understood that aspects of the disclosure are described herein with reference to the figures, which show illustrative embodiments. The illustrative embodiments described herein are not necessarily intended to show all embodiments, but rather are used to describe a few illustrative embodiments. Thus, aspects of the disclosure are not intended to be construed narrowly in view of the illustrative embodiments. In addition, it should be understood that aspects of the disclosure may be used alone or in any suitable combination with other aspects of the invention.

In some embodiments, decorations such as labels may be formed on a web. Each label may include a layer of an adhesive, and the adhesive layer may be exposed on the web and on the decoration. The decorations may be formed on the web in any suitable way. For example, the decorations may include a first decoration layer formed on the web, and this first decoration layer may form the outer surface of the decoration when the decoration is applied to a substrate. This first decoration layer may be optically clear or colored. One or more indicia layers may be provided on the first decoration layer, followed by an adhesive layer formed on the indicia layer(s). In this manner, the decorations may be reverse printed or otherwise formed on the web and may feature an exposed adhesive layer which may be located between the substrate and the indicia and first decoration layers when the decoration is applied to the substrate. In some instances, a release layer may be provided between the web and the first decoration layer to facilitate release of the decorations from the web when the decorations are applied to substrates. For example, decorations such as labels and webs which may be used with the systems provided herein are described in US Patent Application Pub. No. 2016/0335927, which is hereby incorporated by reference in its entirety. However, it should be understood that other types of decorations may be suitable, as the current disclosure is not limited to any particular arrangement and/or method for forming decorations. For example, other suitable types of decorations may include decorations formed by techniques including, but are not limited to, hot or cold foil stamping, flexographic printing, embossing, and/or inkjet printing.

Decorations may bear any suitable visible or non-visible information, such as text, graphics, electronic circuitry (such as an RFID device), etc. Moreover, a decoration may be provided as a single, continuous piece of material applied to a substrate, or alternatively, the decoration may be formed as a plurality of separate decoration components which collectively form the decoration. It should be understood that the systems described herein may be suitable for applying decorations to any suitable substrates, such as bottles or other containers (including irregularly shaped containers), boxes, envelopes, or other packaging materials, products for sale, etc. Moreover, the substrates may be formed from any suitable material, including, but not limited to, paper-based materials, glass, metallic materials (such as aluminum and steel), and polymeric materials (such as PET, PETE, LDPE, HDPE, and PS).

FIG. 1 depicts a schematic cross-sectional view of a decoration 4 formed on a web 1. The decoration 4 includes a first decoration layer 42 (e.g., an overcoat layer), which forms the outermost exposed layer of the decoration when the decoration is applied to the substrate. The decoration further includes one or more indicia layers 43, and an adhesive layer 44, such as a pressure sensitive adhesive layer, which is exposed on a surface of the decoration facing outwardly from the web 1. Each of the layers of the decoration 4 may be formed in register with one another at one or more decoration forming stations to form the decoration. However, it should be understood that registration of the various layers may not require perfect overlap of the layers as illustrated. For example, in some instances, one or more indicia layers 43 may be formed over only a portion of a decoration 4 to provide a desired appearance or arrangement of features in the decoration. In some embodiments, a release layer 41 may be formed between the web 1 and the first decoration layer 42. The release layer may aid in releasing the decorations 4 from the web 1 when the decorations are applied to substrates at an application station.

Figure 2:
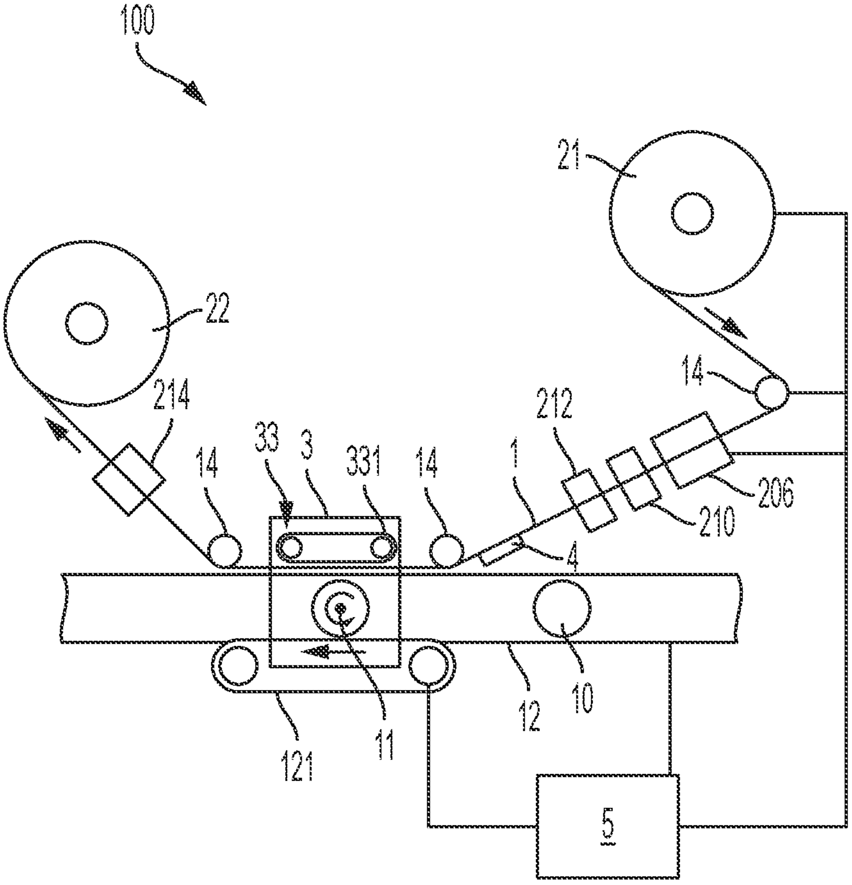
FIG. 2 is a schematic view of a system for decorating substrates in an illustrative embodiment.

FIG. 2 depicts an illustrative embodiment of a system 100 for decorating substrates 10. The system includes a web 1 that travels along a web path from a web supply roll 21 to a web take-up roll 22. The system includes one or more web guides 14 such as rollers (e.g., drive, idle, and/or tension rollers) and other components known in the art for controlling various aspects or characteristics of the web 1. These characteristics may include a direction or velocity of the web, a web tension, a web alignment, and/or a position of the web along a direction transverse to a direction along which the web travels (e.g., to adjust the vertical alignment of the web and decorations relative to the substrates). The system may include any suitable number and/or arrangement of web guides and/or other components to guide and/or control a web as desired (e.g., to define a desired web path) as the current disclosure is not limited in this regard.

The web guides 14 are arranged to guide the web from the supply roll 21 to a decoration forming station 206 where decorations are formed on the web 1. At the decoration forming station 206, the various layers of the decorations, such as the overcoat layer, indicia layer(s), adhesive layer, and release layer (if included) can be formed on the web. It should be understood that a decoration may be formed or deposited on the web in any suitable manner. For example, in some embodiments, the decoration forming station 206 includes an inkjet printing system with one or more print heads arranged to deposit the various decoration layers onto the web in register with one another to form the decorations. In other embodiments, the decoration forming station 206 may include a flexographic printing system, or any other suitable printing system, as the disclosure is not limited to any particular system or method for depositing the decoration layers onto the web. Moreover, it should be understood that the various layers of decoration may be formed using any number of suitable processes or systems. For instance, in some embodiments, the pressure sensitive adhesive layer may be formed using substantially the same processes as those used to form other layers of the decoration. Alternatively, the pressure sensitive adhesive layer may be formed using a different process than the process(es) used to form the other decoration layers.

In some embodiments, a curing station 210 is provided between the decoration forming station 206 and the application station 3. For example, one or more decoration layers (e.g., the indicia layers) may be cured at the curing station 3 to permanently set the decoration layers in place relative to one another. As noted above, the curing station may be configured to apply any suitable curing process, such as curing via exposure to radiation (e.g., UV, visible light, thermal, or electron radiation), or a drying process such as exposure to hot air. Accordingly, it should be understood that the current disclosure is not limited to any particular curing process at the curing station. Moreover, while one curing station is depicted in this embodiment, it should be understood that the systems disclosed herein may include more than one curing station after a decoration forming station, and that each curing station may be configured to perform the same or different types of curing processes.

In some embodiments, the adhesive layer of the decorations may be activatable such that the adhesive increases its viscoelasticity and becomes tacky after activation. Accordingly, the system 200 may include an activation station 212 configured to apply a suitable activation treatment to activate the adhesive. For instance, in some embodiments, the adhesive may comprise a UV activatable pressure sensitive adhesive, and the activation station 212 is configured to expose the pressure sensitive adhesive layer to ultraviolet radiation with a broad spectrum ultraviolet radiation source and/or an LED-based ultraviolet light source. Similar to the curing station 210, the activation station 212 may be configured to apply any suitable activation process, such as activation via exposure to radiation (e.g., UV, visible light, thermal, or electron radiation), or a drying process such as exposure to hot air. Accordingly, it should be understood that the current disclosure is not limited to any particular activation process at the activation station.

After the decorations are formed on the web, the decorations are transported on the web to an application station 3 where the decorations are applied to the substrates 10. After application of the decorations, the web 1 is collected at the take-up roller 22 positioned along the web path after the application station 3. In some embodiments, a cleaning station 214 may be positioned along the web path, such as between the application station 3 and the take-up roll 22. The cleaning station 214 may be configured to remove material from the web 1, e.g., to prepare the web for reuse in applying decorations to substrates. However, in some embodiments, the system 100 need not include the decoration forming station 206, curing station 210, activation station 212 and/or cleaning station 214. Instead, decorations 4 can be preformed on the web 1 and the system 100 used only to transfer the decorations 4 from the web 1 to substrates 10.

At the application station 3, the adhesive layer of the decorations 4 may be brought into contact with substrates 10, and the adhesion between the adhesive layer and the substrates 10 may cause the decorations to release from the web 1 and adhere to the substrates. For example, the adhesive force between the adhesive layer and the substrates 10 may be selected to be larger than an adhesive force between the decorations and the web, thereby allowing the contact with the substrates to pull the decorations off of the web. As noted above, in some instances, a release layer may be formed between the web and an overcoat layer of a decoration. The release layer may be configured to facilitate release of the decoration from the release layer when the pressure sensitive adhesive layer of the decoration is brought into contact with the substrate.

In some embodiments, the decorations may be directly transferred from the web to the substrate, such that the decorations are always supported by either the web or the substrate. In other embodiments, an application station may include one or more features to assist with applying a decoration from a web to a substrate. For instance, an adhering force between the decorations and the web may be similar in strength to an adhering force between the adhesive layer of the decorations and the substrate. Therefore, it may be advantageous to assist with releasing the decorations from the web at the application station to ensure proper application of the decoration to the substrate. In some embodiments, components may be provided at the application station to forcibly press the decorations into contact with the substrate, which may increase the adhesion force between the adhesive layer of the decoration and the substrate.

In some embodiments and as illustrated in FIG. 2, the substrates 10 may be moved by a substrate transport 12 which may include a conveyor to move the substrates 10 towards and from the application station 3. While a conveyor is shown in the figures, it should be understood that substrates may be moved to and/or from the application station 3 by other suitable systems, such as rotary or screw style transport systems. In some cases, the substrate transport 12 can include a substrate support configured to contact substrates 10 at the application station 3 and urge the substrates 10 into contact with the web 1 and/or a decoration 4 on the web 1. For example, the substrate transport 12 can include a belt 121 positioned on a side of a substrate 10 opposite the web 1. The belt 121 can contact a substrate 10 and urge it into contact with the web 1. As discussed more below, the belt 121 or other substrate support at the application station 3 can help control movement of substrates 10 at the application station 3 as well as movement of substrates 10 relative to the web 1 and a decoration 4.

In some embodiments, a web control system may control movement of the web 1 along the web path. For example, the web control system may be configured as part of a controller 5 (e.g., including sensors, actuators, executable software for performing various control functions, etc.) to stop or slow or otherwise adjust movement of the web to facilitate deposition of the various layers of a decoration at the decoration forming station to form a decoration and/or to transfer a decoration to a substrate at the application station 3. In some embodiments, the web control system may be configured to control movement of a portion of the web at the application station 3, and while the web is moving, the movement of the substrates 10 at the application station 3 may impart relative motion between the decoration positioned at the application station and a substrate. Such relative movement can effect transfer of a decoration to a substrate. In some embodiments, a substrate 10 can be moved at a first speed at the application station 3 and the web 1 moved at a different second speed to transfer a decoration 4 to the substrate 10. In some cases, movement of the web 1, substrate 10 and/or substrate support (which may be part of the substrate transport 12) at the application station 3 can cause the substrate to rotate at the application station 3 as a decoration 4 is transferred to the substrate 10. Thus, the substrate and decoration may be brought into contact at the application station, and relative movement may result in the decoration being applied to the substrate, (e.g., by transferring directly from the web to the substrate). After (or during) application of the decoration from the web to the substrate, the web control system may move the web 1 to move another decoration 4 to the application station.

In some embodiments, the web 1 and a decoration 4 on the web 1 can move along a first direction at the application station 3 and a substrate support that urges a substrate 10 into contact with the decoration 4 and/or web 1 can move along the first direction as well. For example, the web 1 in FIG. 2 can move right to left as viewed in FIG. 2 and a portion of the belt 121 that contacts a substrate 10 to urge it into contact with the web 1 can move right to left as well. In some cases, the web 1 and/or belt 121 or other substrate support can move along a linear path at the application station 3, and the respective paths may be parallel to each other. In some embodiments, the web 1 can move along a linear, curved or other non-linear path along the first direction while the belt 121 or other substrate support move along the first direction (e.g., right to left in FIG. 2) along a linear, curved or other non-linear path. In some cases, the web 1 and belt 121 or other substrate support can move at different speeds albeit along a same direction at the application station. For example, the web 1 can move at a web speed that is greater than a support speed at which the substrate support that contacts a substrate 10 at the application station 3 (e.g., a part of the belt 121 that contacts a substrate 10) travels at the application station 3. In some cases, the difference in web speed and substrate support speed can cause substrates 10 to rotate at the application station, e.g., the substrates 10 can rotate about a rotation axis 11 that passes through the substrate 10. In some embodiments, substrates 10 may rotate 180 degrees or more while in contact with the web 1 or decoration 4 and the substrate support (such as the belt 121). In some cases, substrates 10 may rotate 360 degrees, 540 degrees, 720 degrees or more while in contact with the web 1 and substrate support. The rotation axis 11 can move at the application station 3, e.g., along a linear or other direction, at a substrate speed that is different from both the web speed and the substrate support speed, e.g., the web speed may be greater than the substrate speed, and the substrate speed may be greater than the substrate support speed. In some cases, the substrate support speed can be greater than the substrate speed, and the substrate speed can be greater than the web speed. In some cases, the substrate support speed can be less than the substrate speed, and the substrate speed can be less than the web speed. The movement of the substrate 10 relative to a decoration 4 can cause the decoration 4 to be transferred to the substrate 10.

In some cases, a web support 33 can be provided at the application station 3, e.g., on a side of the web 1 opposite the substrates 10. The web support 33 can urge the web 1 and decoration 4 into contact with a substrate 10, e.g., to aid in transfer of the decoration 4 to the substrate 10. The web support 33 can be arranged in various ways, e.g., including a belt 331 as shown in FIG. 2, one or more rollers, a flat plate, etc. In some cases, the web support 33 can contact a substrate 10 and influence movement of the substrate 10 at the application station 3, e.g., the web support 33 and the belt 121 or other substrate support can cooperate to rotate and move substrates 10 through the application station 3. For example, a web support 33 including a belt 331 can be configured so that portions of the belt 331 extend above and below the web 1. The upper and/or lower portions of the belt 331 can be exposed to, and contact, a substrate 10 at the application station 3. In some cases, the substrate support and/or web support 33 can frictionally engage a substrate 10 so that a portion of the substrate 10 in contact with the substrate support and/or web support 33 does not move or moves only slightly relative to the substrate support and/or web support 33. For example, a substrate 10 can frictionally engage the belt 121 and a belt 331 of the web support 33 so that the substrate 10 does not slip or otherwise move relative to the belts 121, 331. Different movement speeds of the belts 121, 331 and the frictional engagement can aid in causing the substrate 10 to rotate as well as move through the application station 3, thereby transferring a decoration to the substrate. With the decoration 4 transferred to the substrate 10, the substrate 10 can exit the application station 3. For example, if the conveyor 12 or other substrate transport operates continuously to move substrates 10, the substrate 10 can be moved from the application station 3 by the conveyor when the substrate is disengaged from the substrate support 121 and/or the web 1 and/or the web support 33.

FIG. 2 shows the controller 5 schematically linked to the belt 121 and/or other portions of the substrate transport 12, the decoration formation station 206, the web guides 14, and the web roll 21. It should be understood that the controller 5 can include one or more components to receive input from (such as sensor data) and provide output to (such as control signals) to any of the components of the system 100 including those shown having links with the controller 5 and others. For example, while links to the curing station 210, activation station 212, and cleaning station 214 are not shown, the controller 5 can be coupled to any of these components and/or others to provide input/output, control, display and other functions as desired. For example, the controller 5 can control operation of the web support 33, e.g., to aid in controlling movement of a substrate 10 through the application station 3, the take up roll 22 or other web control components to control movement of the web 1 at one or more locations of the web path, and so on. The controller 5 can include any suitable components for performing its functions, including a user interface, a programmed processor and/or other data processing device or devices along with suitable software or other operating instructions that are executable by the data processing device to perform any of the functions described herein or otherwise, one or more memories (including non-transient storage media that can store software and/or other operating instructions executable by the data processing device), sensors, input/output interfaces, communication devices (e.g., including a transceiver, radio, gateway, interface, etc. suitably programmed or otherwise configured to communicate using any suitable wired or wireless protocol), buses or other links, a display, switches, relays, triacs, a battery or other power source or supply, actuators, motors, linkages or other devices to provide physical movement, and/or other components necessary to perform desired input/output, control or other functions. A user interface can be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on. As another example, the belt 121, web support 33 and/or other components can include any suitable actuators such as motors, hydraulic or pneumatic actuators, linkages, and so on under control of the controller 5 to move the belts, rollers and/or other components of the substrate transport 12 and/or web support 33.

Figure 3:
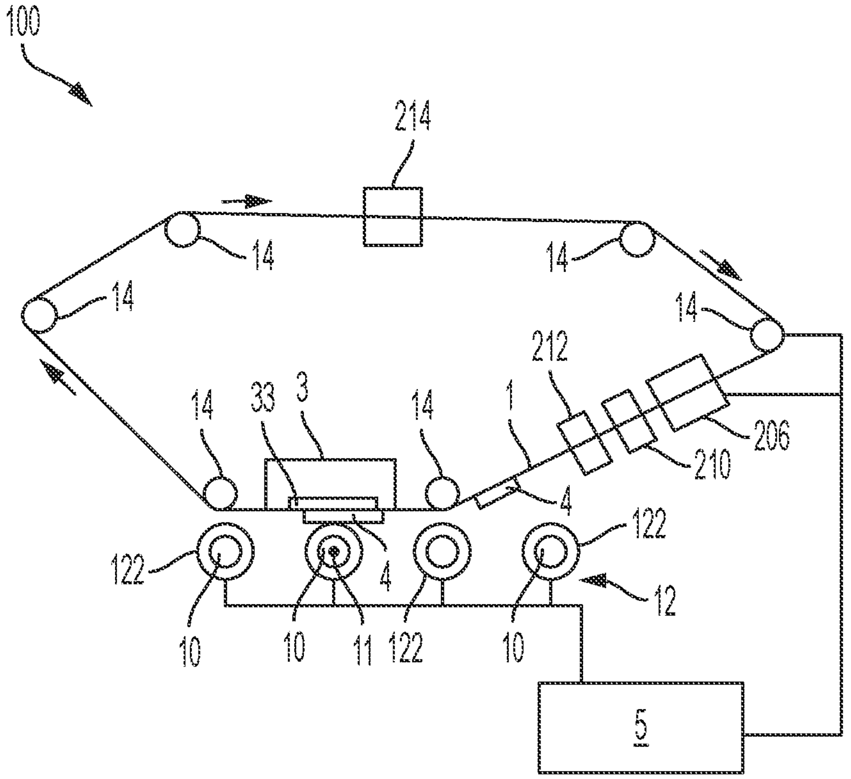
FIG. 3 is a schematic view of a system for decorating substrates including a web formed as a continuous loop in an illustrative embodiment.

As discussed previously, in some embodiments, a reusable web may be formed as a continuous loop. For example, FIG. 3 depicts an embodiment of a system 100 for decorating substrates 10 similar to the embodiment discussed above in connection with FIG. 2, but in which the web 1 forms a continuous loop. In particular, the system 100 includes web guides 14 arranged to guide the web from the application station 3 back to the decoration forming station 206. Additionally, the system 100 may include a cleaning station 214 positioned along the web path between application station 3 and the decoration forming station 206 to clean the web 1.

FIG. 3 also illustrates another option for a substrate support or other portion of a substrate transport 12 for contacting one or more substrates 10 and urging the substrates into contact with the web 1 and/or a decoration 4. In some embodiments, the substrate transport 12 can include one or more platforms 122 that engage with a substrate 10 and move substrates 10 at the application station 3. For example, the platforms 122 can include a support surface on which a substrate 10 is held in place, e.g., by one or more clamps, vacuum, a collet, adhesive, etc. The support surface of the platforms 122 can be moveable along a first direction, e.g., right to left in FIG. 3, at the application station 3. In addition, the platforms 122 can be rotatable, e.g., so that a substrate 10 on the platform 122 is rotated about a rotation axis 11 that passes through the substrate 10 or is otherwise positioned. The platforms 122 can be moved at the application station at a support speed and/or rotated at a rotation speed which can be controlled by the controller 5 as desired. Thus, the platforms 122 can urge a substrate 10 into contact with the web 1 and/or a decoration 4 while moving the substrate 10 along the first direction at the support speed and rotating the substrate at the rotation speed. The support speed can be different from the web speed at which the web and decoration are moved at the application station, e.g., the web speed can be greater than the support speed. In some cases, the substrate support can simultaneously urge multiple substrates 10 to contact the web 1 and/or a corresponding decoration 4 at the application station 3. For example, multiple platforms 122 can simultaneously urge a corresponding substrate 10 to contact the web 1 and/or a corresponding decoration 4, thereby causing transfer of the decoration to the substrate. In some cases, the platforms 122 can rotate a substrate 10 any suitable amount at the application station 3 and/or while in contact with the web 1. For example, substrates 10 can be rotated 180 degrees, 360 degrees, 540 degrees, 720 degrees or more while in contact with the web 1 and/or a web support 33, such as a belt, roller or plate.

Figure 4:
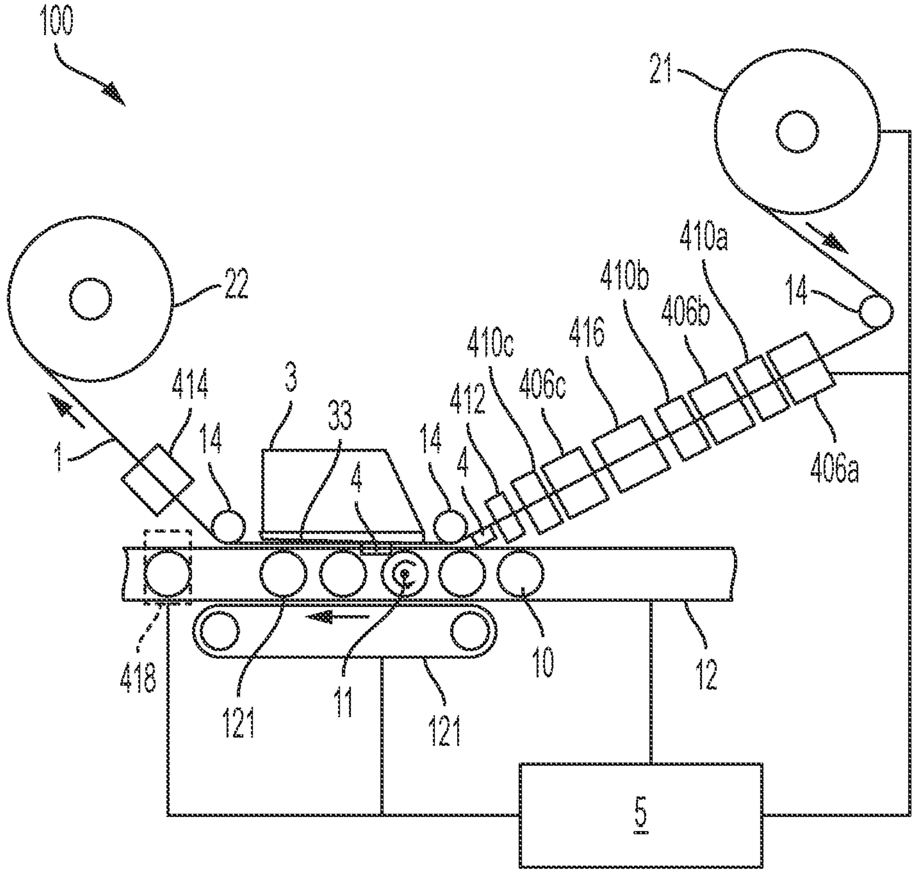
FIG. 4 is a schematic view of a system for decorating substrates including multiple decoration forming stations in an illustrative embodiment.

FIG. 4 depicts another embodiment of a system 100 for decorating substrates 10. Similar to the embodiments discussed above in connection with FIG. 2, the system 100 includes a web 1 that travels along a web path from a web supply roll 21 to a web take-up roll 22, as well as a web control system including one or more web guides 14. The system further includes an application station 3 and a substrate transport 12 arranged to transport substrates 10 to the application station 3 where decorations 4 are applied to the substrates 10.

In some embodiments, the system 100 can include three decoration forming stations 406*a*, 406*b*, and 406*c*, and three curing stations 410*a*, 410*b* and 410*c* positioned along the web path before the application station 3. Each decoration station is configured to form a portion of the decoration. For example, the first decoration station 406*a* may be configured to deposit the overcoat layer of a decoration, the second decoration station 406*b* may be configured to deposit the indicia layer(s) of the decoration, and the third decoration station 406*c* may be configured to deposit the adhesive layer of the decoration. As noted previously, each layer may be deposited in register with the other layers to form the decoration. Each curing station 410*a*, 410*b*, and 410*c* is positioned along the web path after an associated decoration forming station, and each curing station may be configured to cure the layer(s) deposited at its associated decoration forming station. For instance, the first curing station 410*a* may be configured to cure the layer(s) deposited at the first decoration forming station 406*a* before subsequent layers of the decoration are formed and cured at the second and third decoration forming stations and curing stations, respectively.

While three decoration forming stations 406 and associated curing stations 410 are depicted in FIG. 4, it should be understood that the current disclosure is not limited to any particular number of decoration forming stations and/or curing station used to form a decoration on the web. For example, in some embodiments, a system may include two decoration forming stations and curing stations, or more than three decoration forming stations and curing stations. Moreover, in some embodiments, the number of curing stations may be different than the number of decoration forming stations. For example, a single curing station may be configured to cure layers of a decoration deposited at multiple decoration forming stations.

As illustrated in FIG. 4, the system 100 may further include an activation station 412 at which an activatable adhesive layer may be activated (if required). However, as discussed above, a curing station (e.g., curing station 410*c*) may be configured to activate the activatable adhesive layer, and thus the activation station may not be included in some embodiments. Additionally, in some embodiments, a second adhesive activation station 418 may be positioned after the application station 3. This second activation station 418 may be configured to apply an activation or curing treatment to the adhesive after a decoration 4 has been applied to a substrate 10. For example, the second activation station 418 may be configured to apply UV radiation to the adhesive to at least partially cure (or otherwise activate) a UV-curable adhesive. However, it should be understood that activation of the adhesive prior to application (e.g., at activation station 412 or curing station 410*c*) may be sufficient in some applications, and thus the second activation station 418 may not be included in some embodiments. Similar to the embodiments discussed above in connection with FIGS. 2 and 3, the system 100 also may include a cleaning station 414 configured to clean the web 1 to prepare the web for subsequent formation of decorations on the web.

In some embodiments, a system 100 for decorating substrates may include one or more features to aid in controlling the web 1, such as festoons 416 to aid in containing the web along different portions of the web path. For example, the festoons 416 may be configured to define a variable path length through which the web travels in order to allow accumulation of the web within the festoons. As illustrated, festoons 416 may be positioned at one or more locations along the web path, such as prior to the application station 3 and/or between curing stations and decoration stations (e.g., between curing station 410*b* and decoration station 406*c*) and/or after the application station 3. The festoons 416 may permit the web 1 to travel at different speeds in various portions of the web path, such as at the decoration forming stations, curing stations, application station, etc. Also, festoons or other similar features can be employed in systems 100 that do not form a decoration on the web, but rather apply pre-formed decorations from a web to substrates. Such an arrangement may aid in ensuring a desired web speed at the application station 3.

FIG. 4 also illustrates another option for simultaneously urging multiple substrates 10 into contact with the web 1 at the application station 3, e.g., to provide for transfer of decorations to multiple substrates 10 at the same time. In some embodiments, the substrate transport 12 may include a portion such as a movable belt 121 or other substrate support configured to contact and urge multiple substrates 10 into contact with the web 1, a corresponding decoration 4 and/or a web support 33 (such as a belt, set of rollers, a plate, etc.). As in the FIG. 2 embodiment, the portion of the belt 121 that contacts substrates 10 can move at a different speed than the web speed and/or that a rotation axis 11 of substrates 10 move at the application station 3. Differences in the web speed and support speed can cause rotation of the substrates 10 and transfer of decorations 4 as discussed above. Note that multiple decorations on the web 1 can be applied to a substrate 10, and in some cases multiple decorations 4 can be applied over previously transferred decorations 4. For example, a substrate 10 can be rotated 360 degrees or more while in contact with the web 1. This can allow for decorations at spaced apart locations on the web 1 to be transferred to a same substrate 10 and/or for decorations 4 to be applied one over the other. As an example, if a substrate is rotated 720 degrees while in contact with the web 1 or otherwise positioned to have a decoration 4 transferred to the substrate 10, a first decoration 4 can be transferred to the substrate 10 during the first 360 degree rotation, and a second decoration 4 can be transferred to the substrate during the second 360 degree rotation. The second decoration 4 can be applied over (in whole or in part) the first decoration 4 or otherwise positioned on the substrate 10.

Figure 5:
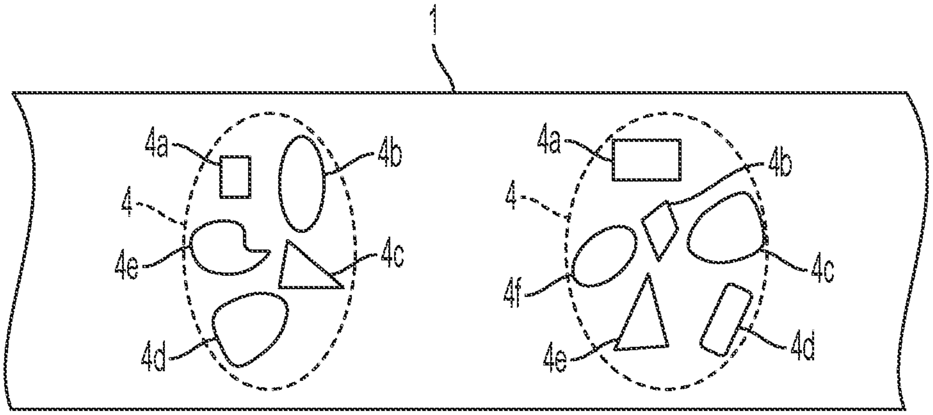
FIG. 5 is a schematic representation of decorations including multiple elements on a web.

As discussed above, in some instances, a decoration may include two or more physically separate components that together make up a single decoration. For example, FIG. 5 depicts a portion of a web 1 with two decorations 4 formed thereon. Each decoration includes multiple separate decoration elements 4*a*-4*f*. When the decorations 4 are applied to substrates, the decoration components 4*a*-4*f* of each decoration 4 are applied together in register with one another and work together to form a single decoration on the substrate. Depending on the particular embodiment, a decoration may include any suitable number of separate decoration components 4*a*-4*f*, and each decoration component may have any suitable shape, orientation, color, pattern, and so on. For example, each decoration component could be graphic design composed of two or more separate features. In other instances, each decoration may be a text string (e.g., a word, phrase or number), and the decoration components may include individual text characters that together form the text string. Moreover, combinations of different types of decoration components (e.g., graphical, text, or other types of decoration elements) may be included within a single decoration.

As illustrated in FIG. 5, in some embodiments, different decorations 4 formed on a web may be different from one another. For example, each decoration may have different types, number, and or arrangements of decoration components to form different decorations. In some instances, a system may be configured to form customized decorations for each substrate to be decorated. For example, such arrangements may facilitate individualized labeling runs in which cache substrate (e.g., containers) are decorated with individualized labels. However, it should be understood that the current disclosure is not limited to systems utilizing variable printing arrangements, and thus each decoration formed on the web and applied to substrates may be substantially identical in some embodiments.

In some embodiments, a method for transferring a decoration 4 to a substrate 10 can include moving a portion of a web 1 having a decoration 4 on a first side of the web at an application station such that the decoration is moved at a web speed along a first direction. For example, the portion of the web 1 and decoration 4 can follow a linear, curved or other path at the application station along the first direction at a web speed which can be fixed or variable. The decoration can have an adhesive exposed on a surface of the decoration facing outwardly from the first side of the web, e.g., so that contact of a substrate 10 with the decoration 4 can cause the decoration 4 to adhere to the substrate 10. The substrate may contact the web 1 and/or decoration 4 so that the substrate 10 does not slip relative to the web and/or decoration. Adherence of the decoration 4 to the web 1 and the substrate 10 can prevent such slip, and can drive rotation of the substrate in some cases, e.g., movement of the web and decoration can drive rotation of the substrate at least in part. A substrate support can be moved at the application station 3 at a support speed along the first direction with the substrate support urging a substrate 10 into contact with the decoration 4. Similar to the web 1 and decoration 4, the substrate support can follow a linear, curved or other path at the application station along the first direction which can be the same as or different from the path of the web and decoration, e.g., the substrate support and the web can move along parallel, linear paths at the application station. In some cases, the substrate support can move at a support speed that is different from the web speed, e.g., the web speed may be greater (or less than) the support speed. For example, the substrate support can include a belt 121 having a portion configured to contact a substrate to urge the substrate 10 into contact with the web 1 and/or a decoration 4, and the belt portion can move at the support speed along the first direction. The speed of the belt portion can be greater than (or less than) the web speed of the web. In some cases, the substrate support can include a platform 122 that engages the substrate 10 and moves the substrate at the application station along the first direction. For example, a platform 122 can include a support surface on which a substrate 10 is held in place, e.g., by one or more clamps, vacuum, a collet, adhesive, etc. The platform 122 can move at a support speed that is different from the web speed. A decoration 4 can be transferred from the web 1 to the substrate 10 at the application station while the decoration 4 moves along the first direction at the web speed and the substrate support moves along the first direction at the support speed. For example, differences in the support speed and the web speed can cause a substrate 10 to rotate at the application station and movement of the substrate 10 relative to the web 1 can cause the decoration 4 to be transferred to the substrate 10. In some cases, the substrate support can itself rotate the substrate 10, e.g., a platform 122 can be rotated at a desired rotation speed to cause the substrate to be rotated about a rotation axis. In some cases, the outer surface of the substrate 10 can "roll" along the web 1, causing the outer surface to contact different portions of the web 1 and decoration 4 to cause transfer of the decoration to the substrate. In some cases, the substrate can be rotated at the application station about a rotation axis that passes through the substrate, e.g., through a center of mass or center of inertia of the substrate 10. For example, a substrate 10 can have a cylindrically shaped portion and the substrate 10 can rotate about a rotation axis that is coaxial with a geometric center or longitudinal axis of the cylindrical shape. The rotation axis of the substrate 10 can move at the application station at a substrate speed that is different from the web speed and/or the support speed. For example, the substrate speed can be less than the web speed, and greater than the support speed. In some embodiments, a plurality of substrates can be simultaneously urged into contact with the web 1 and/or a corresponding decoration 4 and/or a web support 33 by a substrate support such as a belt 121, platform 122 or other portion of a substrate transport 12. Thus, in some cases, decorations may be transferred to a plurality of substrates at the same time.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method for decorating a substrate, comprising:

moving a web having a decoration on a first side of the web at an application station such that the decoration is moved at a web speed in a web direction, the decoration having an adhesive exposed on a surface of the decoration facing outwardly from the first side of the web;

moving a substrate support at the application station at a support speed along the web direction, the substrate support urging a substrate into contact with the decoration by applying a force to the substrate that is directed toward the decoration and is perpendicular to the web direction simultaneous with movement of the substrate in the web direction;

rotating the substrate at the application station about a rotation axis that passes through the substrate; and transferring the decoration from the web to the substrate at the application station while the decoration moves in the web direction, the substrate moves in the web direction, the substrate rotates about the rotation axis and the substrate support moves along the web direction.

2. The method of claim 1, wherein moving the substrate support includes moving a belt that contacts the substrate to urge the substrate into contact with the decoration.

3. The method of claim 2, wherein moving the substrate support includes moving a portion of the belt that contacts the substrate along the web direction at a support speed that is less than the web speed.

4. The method of claim 2, wherein moving the substrate support includes moving a portion of the belt that contacts the substrate along the web direction at a support speed that is greater than the web speed.

5. The method of claim 1, wherein moving the substrate support includes moving a platform on which the substrate is mounted along the web direction.

6. The method of claim 5, wherein rotating the substrate includes rotating the platform about the rotation axis to rotate the substrate about the rotation axis.

7. The method of claim 1, wherein the web direction is linear.

8. The method of claim 1, wherein the web speed is greater than the support speed.

9. The method of claim 1, wherein the web speed is less than the support speed.

10. The method of claim 1, wherein moving the substrate support includes moving the substrate support such that the substrate support urges a plurality of substrates into contact with the web.

11. The method of claim 10, wherein moving the substrate support includes moving a belt that contacts the plurality of substrates to urge the plurality of substrates into contact with the web.

12. The method of claim 10, wherein moving the substrate support includes urging each of the plurality of substrates into simultaneous contact with a respective decoration on the web to transfer decorations to the plurality of substrates at a same time.

13. The method of claim 1, wherein rotating the substrate includes moving the web to at least in part drive rotation of the substrate.

14. The method of claim 1, wherein moving the substrate support includes moving the substrate support in a support direction that is parallel to the web direction.

15. A system for decorating substrates, comprising:

a web including a plurality of decorations on a first side of the web, each decoration having an adhesive exposed on a surface of the decoration facing outwardly from the first side of the web;

an application station at which the decorations are applied from the web to substrates;

a web path along which the web travels to transport the decorations to the application station;

a web control system configured to control movement of the web along the web path;

a substrate transport having a portion configured to urge a substrate into contact with a decoration on the web at the application station; and a controller configured to control operation of the web control system and the substrate transport to transfer decorations from the web to substrates at the application station, the controller configured to control the web control system to move a portion of the web bearing the decoration to move along a first direction at the application station and to control the portion of the substrate transport to move along the first direction while urging the substrate into contact with the decoration moving at the application station by applying a force to the substrate that is directed toward the decoration and perpendicular to the first direction simultaneous with movement of the substrate in the first direction and causing the substrate to rotate about a rotation axis that passes through the substrate.

16. The system of claim 15, wherein the substrate transport includes a belt having a portion configured to move along the first direction, contact the substrate and urge the substrate into contact with the decoration.

17. The system of claim 16, wherein the controller is configured to move the belt such that the portion of the belt moves at a speed that is less than a speed of the decoration at the application station.

18. The system of claim 16, wherein the controller is configured to move the belt such that the portion of the belt moves at a speed that is greater than a speed of the decoration at the application station.

19. The system of claim 15, wherein the substrate transport includes a platform on which the substrate is mountable for movement along the first direction and rotation about the rotation axis.

20. The system of claim 15, wherein the portion of the substrate transport moves in a linear direction at the application station.

21. The system of claim 20, wherein the portion of the web and the decoration move in a linear direction at the application station.

22. The system of claim 15, wherein the portion of the web and the decoration move in a linear direction at the application station.

23. The system of claim 15, wherein the portion of the substrate transport is configured to contact and urge a plurality of substrates into simultaneous contact with the web and a respective decoration at the application station to transfer decorations to the plurality of substrates at a same time.

24. The system of claim 15, further comprising a support surface positioned to urge the web and the decoration into contact with the substrate at the application station.

25. The system of claim 21, wherein the support surface includes a roller, a belt or plate.

26. A method for decorating a substrate, comprising:

moving a web having a decoration on a first side of the web at an application station such that the decoration is moved at a web speed along a first direction, the decoration having an adhesive exposed on a surface of the decoration facing outwardly from the first side of the web;

moving a substrate support at the application station at a support speed that is different from the web speed along the first direction, the substrate support urging a substrate into contact with the decoration by applying a force to the substrate that is directed toward the decoration and is perpendicular to the first direction simultaneous with movement of the substrate in the first direction; and transferring the decoration from the web to the substrate at the application station while the decoration moves along the first direction at the web speed and the substrate support moves along the first direction at the support speed.

27. The method of claim 26, wherein transferring the decoration includes rotating the substrate at the application station about a rotation axis that passes through the substrate.

28. The method of claim 26, wherein moving the substrate support includes moving a belt that contacts the substrate to urge the substrate into contact with the decoration.

29. The method of claim 26, wherein moving the substrate support includes moving a platform on which the substrate is mounted along the first direction.

30. The method of claim 26, wherein moving the substrate support includes rotating the platform about a rotation axis to rotate the substrate about the rotation axis.

31. The method of claim 26, wherein the web and decoration are moved in a linear direction at the application station.

32. The method of claim 31, wherein the substrate support is moved in a linear direction at the application station.

33. The method of claim 26, wherein the web speed is greater than the support speed.

34. The method of claim 26, wherein the web speed is less than the support speed.

35. The method of claim 26, wherein moving the substrate support includes moving the substrate support such that the substrate support simultaneously urges a plurality of substrates into contact with the web to transfer decorations to the plurality of substrates at a same time.

36. The method of claim 35, wherein moving the substrate support includes moving a belt that contacts the plurality of substrates to urge the plurality of substrates into contact with the web.

37. The method of claim 35, wherein moving the substrate support includes urging each of the plurality of substrates into contact with a respective decoration on the web.

38. The method of claim 26, wherein the substrate support and the web are moved in parallel directions.

39. The method of claim 26, wherein moving the web and moving the substrate support include moving the substrate relative to the web and the substrate support.

* * * * *